United States Patent
Ishihara et al.

(10) Patent No.: US 10,991,987 B2
(45) Date of Patent: Apr. 27, 2021

(54) SOLID STATE BATTERIES

(71) Applicant: TOYOTA MOTOR EUROPE, Brussels (BE)

(72) Inventors: Yuya Ishihara, Brussels (BE); Yuki Katoh, Brussels (BE)

(73) Assignee: TOYOTA MOTOR EUROPE, Brussels (BE)

(*) Notice: Subject to any disclaimer, the term of this patent is extended or adjusted under 35 U.S.C. 154(b) by 0 days.

(21) Appl. No.: 16/314,912

(22) PCT Filed: Feb. 23, 2017

(86) PCT No.: PCT/EP2017/054197
§ 371 (c)(1),
(2) Date: Jan. 3, 2019

(87) PCT Pub. No.: WO2018/153461
PCT Pub. Date: Aug. 30, 2018

(65) Prior Publication Data
US 2019/0372175 A1 Dec. 5, 2019

(51) Int. Cl.
| | |
|---|---|
| *H01M 10/42* | (2006.01) |
| *H01M 2/02* | (2006.01) |
| *H01M 10/0562* | (2010.01) |
| *H01M 10/0565* | (2010.01) |
| *H01M 10/0525* | (2010.01) |

(52) U.S. Cl.
CPC ..... *H01M 10/4235* (2013.01); *H01M 2/0285* (2013.01); *H01M 10/0562* (2013.01); *H01M 10/0565* (2013.01); *H01M 10/0525* (2013.01); *H01M 2200/10* (2013.01)

(58) Field of Classification Search
CPC .......... H01M 10/4235; H01M 2/0285; H01M 2200/10
See application file for complete search history.

(56) References Cited

U.S. PATENT DOCUMENTS

2018/0166735 A1* 6/2018 Busacca ............ H01M 10/0525

FOREIGN PATENT DOCUMENTS

| EP | 1 487 034 A2 | 12/2004 |
|---|---|---|
| JP | 11-191436 A | 7/1999 |
| JP | 2009-016235 A | 1/2009 |
| JP | 2010-015932 A | 1/2010 |
| JP | 2011-28883 A | 2/2011 |
| JP | 2011-142040 A | 7/2011 |
| JP | 2013-114796 A | 6/2013 |

OTHER PUBLICATIONS

International Search Report for PCT/EP2017/054197 dated Jun. 2, 2017 [PCT/ISA/210].
Office Action dated Feb. 18, 2020 in Japanese Application No. 2019-500285.

* cited by examiner

*Primary Examiner* — Ladan Mohaddes
(74) *Attorney, Agent, or Firm* — Sughrue Mion, PLLC

(57) ABSTRACT

A solid state battery (10) including a stack of cells (22), each cell comprising a positive electrode (12), a negative electrode (14) and a solid electrolyte (16) disposed between the positive electrode (12) and the negative electrode (14), wherein a current collector (18) is disposed between the negative electrode (14) of a first cell (20A) and the positive electrode (12) of a second cell (20B), the second cell (20B) being adjacent to the first cell (20A), the solid state battery (10) comprising an ionic conductor (26) having two configurations, a normal configuration wherein the ionic conductor (26) is not in contact with the current collector (18) and a short-circuit configuration wherein the ionic conductor (26) is in contact with the current collector (18), the negative electrode (14) of the first cell (20A) and the positive electrode (12) of the second cell (20B) and wherein the ionic conductor (26) has an ionic conductivity which smaller than an electronic conductivity of the current collector (18).

9 Claims, 1 Drawing Sheet

SOLID STATE BATTERIES

CROSS REFERENCE TO RELATED APPLICATIONS

This application is a National Stage of International Application No. PCT/EP2017/054197 filed Feb. 23, 2017.

FIELD OF THE DISCLOSURE

The present disclosure is related to solid state batteries.

BACKGROUND OF THE DISCLOSURE

Lithium-based batteries are part of a family of rechargeable battery types in which lithium ions move from the negative electrode to the positive electrode during discharge and from the positive electrode to the negative electrode when charging.

There are various types of lithium-based batteries, and interest has arisen in solid-state type batteries in recent years. In such batteries, an electrolyte of the battery, previously a liquid or gel, is replaced by a solid material. For example, JP 2011-028883 discloses a secondary battery with a lithium-ion-conductive nonaqueous electrolyte. Such solid state batteries tend to have improvements in performance as a temperature increases. Moreover, these solid state batteries are safer as there is no liquid present in the batteries.

Nevertheless, abnormalities may occur during the use of the solid state battery that may produce temperature. The temperature may rise to a threshold temperature, which may result in battery damage and/or additional consequences. Devices intended to stop charging in case of over-charging of the battery and/or when the temperature is too high are known.

SUMMARY OF THE DISCLOSURE

Currently, it remains desirable to increase the safety of solid state batteries. For example, the inventors of the present application have recognized that it is desirable to release the energy present in the solid state battery after charging has been stopped due to abnormal conditions.

Therefore, according to embodiments of the present disclosure, a solid state battery is provided. The solid state battery includes a stack of cells, each cell comprising a positive electrode, a negative electrode and a solid electrolyte disposed between the positive electrode and the negative electrode, wherein a current collector is disposed between the negative electrode of a first cell and the positive electrode of a second cell, the second cell being adjacent to the first cell, the solid state battery comprising an ionic conductor having two configurations, a normal configuration wherein the ionic conductor is not in contact with the current collector and a short-circuit configuration wherein the ionic conductor is in contact with the current collector, the negative electrode of the first cell and the positive electrode of the second cell and wherein the ionic conductor has an ionic conductivity which smaller than an electronic conductivity of the current collector.

By providing such a configuration, when the solid state battery is under abnormal conditions and the charging of the solid state battery is stopped, the ionic conductor takes the short-circuit configuration in which the ionic conductor is in contact with the current collector, the negative electrode of the first cell and the positive electrode of the second cell. Thanks to the ionic conductivity of the ionic conductor being smaller than the electronic conductivity of the current collector, an ionic short-circuit is formed and a slow and safe energy release of the energy present in the solid state battery may occur through the electrodes of the solid state battery. The electrons pass through the current collector from the negative electrode to the positive electrode and $Li^+$ ions pass through the ionic conductor from the negative electrode to the positive electrode. The solid state battery is therefore safer compared to a solid state battery not having such an ionic conductor, even when the solid state battery is in an abnormal configuration, during which the temperature of the solid state battery rises.

The ionic conductivity of the ionic conductor may be equal to or greater than $10^{-5}$ S/cm (Siemen/centimetre).

The conductivity is given at room temperature.

The ionic conductor may be configured to go from the normal configuration to the short-circuit configuration at a temperature equal to or greater than 100° C.

Therefore, when the temperature rise in the solid state battery, a slow and safe energy release occurs. The solid state battery is then safer.

The ionic conductor may a polymer ionic conductor.

Examples of polymer ionic conductor are as follows: polyethylene oxide (PEO)/$LiCF_3SO_3$, polyphenylene oxide (PPO)/$LiCF_3SO_3$, poly[ethylene oxide-co-2-(2-methoxyethoxy)ethyl glycidyl ether] (P(EO/MEEGE))/$LiCF_3SO_3$, polysiloxane/$LiClO_4$.

The ionic conductor may be an inorganic ionic conductor.

Examples of inorganic ionic conductor are as follows: $Li_2S$—$SiS_2$, $Li_{0.35}La_{0.55}TiO_3$ (LLTO), $Li_2S$—$GeS_2$—$P_2S_5$.

The ionic conductor may be mounted on a bimetallic actuator.

The two metals forming the bimetallic actuator having different linear coefficient of thermal expansion, when the temperature rises, the bimetallic actuator may progressively change shape and allow the ionic conductor to switch from the normal configuration to the short-circuit configuration.

The stack of cells may be surrounded by a metallic casing and a metal forming the bimetallic actuator may be the same metal as the metallic casing.

The solid state battery may comprise n cells and a number of ionic conductors equal to or greater than n/10.

In abnormal conditions, the safe slow discharge of the solid state battery may be obtained with a number of ionic conductors that is less than the number of cells present in the solid state battery.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
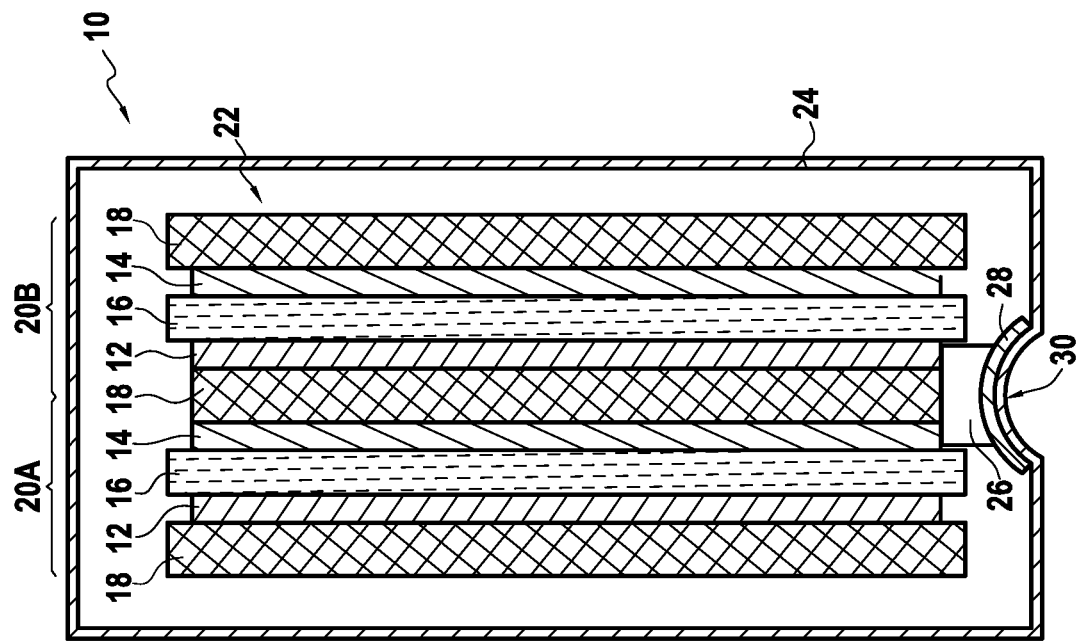
FIG. 1 shows a schematic cross-sectional view of an exemplary solid state battery according to embodiments of the present disclosure in a normal configuration.

FIG. 1 shows a schematic cross-sectional view of an exemplary solid state battery 10 according to embodiments of the present disclosure. In FIG. 1, the solid state battery 10 comprises a first cell 20A and a second cell 20B, adjacent to the first cell 20A. The first cell 20A and the second cell 20B form a stack of cells 22. Each cell 20A, 20B comprises a positive electrode 12 and a negative electrode 14. The cell 10 also comprises a solid electrolyte 16 disposed between the positive electrode 12 and the negative electrode 14, the positive electrode 12, the solid electrolyte 16 and the negative electrode 14 being disposed between two current collectors 18.

The positive electrode 12 may comprise $LiCoC_2$, $LiMn_2O_4$, $LiNiO_2$, $LiCo_wNi_xMn_yAl_zO_2$, $LiFePO_4$, $LiMnPO_4$, $LiCoPO_4$ or any suitable material for forming a positive electrode 12 in a solid state battery 10. The negative electrode 14 may comprise C, Si, metallic Li, $Li_4Ti_5O_{12}$, $TiO_2$, Sn, Al or any suitable material for forming a negative electrode 14 in a solid state battery 10. The solid electrolyte 16 may comprise polymer ionic conductor such as polyethylene oxide (PEO)/$LiCF_3SO_3$, polyphenylene oxide (PPO)/$LiCF_3SO_3$, poly[ethylene oxide-co-2-(2-methoxyethoxy)ethyl glycidyl ether] (P(EO/MEEGE))/$LiCF_3SO_3$, polysiloxane/$LiClO_4$ or inorganic ionic conductor such as $Li_2S$—$SiS_2$, $Li_{0.35}La_{0.55}TiO_3$ (LLTO), $Li_2S$—$GeS_2$—$P_2S_5$ or any suitable material for forming a solid electrolyte 16 in a solid state battery 10. The current collectors 18 may be made of stainless steel, gold (Au), platinum (Pt), nickel (Ni), aluminum (Al) or copper (Cu) or alloys comprising these materials. This list is not limitative. The two current collectors 18 may be made of the same material or the two current collectors may be made of different materials. For example, the current collector on the positive electrode side may be made of Al and the current collector on the negative electrode side may be made of Cu.

The solid state battery 10 comprises a container 24 enclosing the stack of cells 22. In FIG. 1, the stack of cells 22 comprises a first cell 20A and a second cell 20B, the two adjacent cells 10 share a current collector 18. The stack of cells 22 may comprise more cells 10. The elements of the solid state battery 10 that are not requested for the comprehension of the present disclosure have been omitted and will not be describe in this disclosure.

The solid state battery 10 also comprises an ionic conductor 26 having two configurations. In FIG. 1, the ionic conductor 26 is in a normal configuration, in which the ionic conductor 26 is not in contact with the current collector 18.

Figure 2:
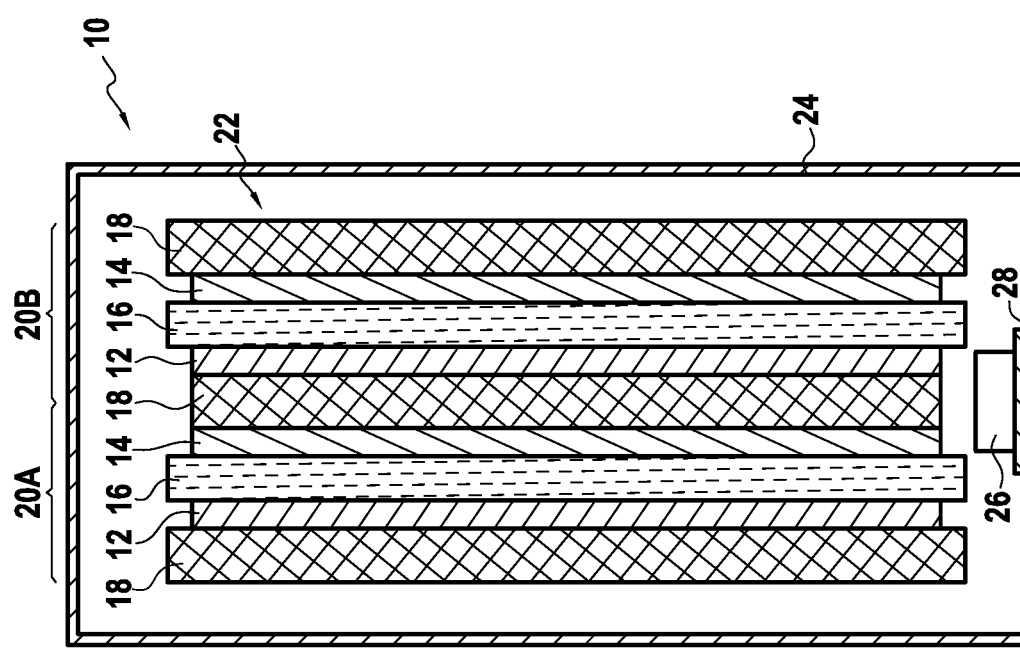
FIG. 2 shows a schematic cross-sectional view of the exemplary solid state battery of FIG. 1 in a short-circuit configuration.

In FIG. 2, the ionic conductor 26 is in a short-circuit configuration, in which the ionic conductor 26 is in contact with the current collector 18, the negative electrode 14 of the first cell 20A and the positive electrode 12 of the second cell 20B.

Generally, ionic conductor 26 may have an ionic conductivity equal to or smaller than $10^{-1}$ S/cm, whereas the current collector 18 may have an electronic conductivity equal to or greater than $10^5$ S/cm. The ionic conductivity of the ionic conductor 26 is smaller than the electronic conductivity of the current collector 18.

The ionic conductor 26 may comprise polymer ionic conductor such as polyethylene oxide (PEO)/$LiCF_3SO_3$, polyphenylene oxide (PPO)/$LiCF_3SO_3$, poly[ethylene oxide-co-2-(2-methoxyethoxy)ethyl glycidyl ether] (P(EO/MEEGE))/$LiCF_3SO_3$, polysiloxane/$LiClO_4$ or inorganic ionic conductor such as $Li_2S$—$SiS_2$, $Li_{0.35}La_{0.55}TiO_3$ (LLTO), $Li_2S$—$GeS_2$—$P_2S_5$ or any suitable material for forming an ionic conductor 26 in a solid state battery 10.

The ionic conductor 26 may be made from a different material than the solid electrolyte 16.

Preferably, the ionic conductivity of the ionic conductor 26 is equal to or greater than $10^{-5}$ S/cm.

In FIGS. 1 and 2, the ionic conductor 26 is on a metallic plate 28, which is mounted on the container 24, the metallic plate 28 being made from a different metal than the container 24. The metallic plate 28 and a part 30 of the container 24 on which the metallic plate 28 is mounted form a bimetallic actuator. Therefore, the ionic conductor 26 is mounted on the bimetallic actuator.

The bimetallic actuator may deform under the effect of the rising temperature inside the solid state battery 10 and may allow the ionic conductor 26 to take the short-circuit configuration at a temperature which is equal to or higher than 100° C. Therefore, the slow release of energy can take place and the temperature rise of the solid state battery 10 is controlled.

The bimetallic actuator may be replaced by an electronic control actuator triggered by a controller comprising a temperature sensor for example.

The solid state battery 10 of FIGS. 1 and 2 is schematic. It is understood that a solid state battery 10 may comprise a large number of adjacent cells 20A, 20B. For the slow release of the energy in the solid state battery when the solid state battery is in an abnormal situation, the number of ionic conductors 26 does not need to be equal to the number of current collectors 18. Indeed, one ionic conductor 26 every ten current collectors 18 or cells 20A, 20B could be enough. However, a smaller number of ionic conductors 26 may also be considered as enough to perform a safe slow release of the energy of the solid state battery 10.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A solid state battery comprising a stack of cells, each cell comprising a positive electrode, a negative electrode and a solid electrolyte disposed between the positive electrode and the negative electrode, wherein a current collector is disposed between the negative electrode of a first cell and the positive electrode of a second cell, the second cell being adjacent to the first cell, the solid state battery comprising an ionic conductor being configured to move into two positions, the two positions comprising a normal position wherein the ionic conductor is not in contact with the current collector and a short-circuit position wherein the ionic conductor is in contact with the current collector, the negative electrode of the first cell and the positive electrode of the second cell and wherein the ionic conductor has an ionic conductivity which smaller than an electronic conductivity of the current collector.

2. The solid state battery according to claim 1, wherein the ionic conductivity of the ionic conductor is equal to or greater than $10^{-5}$ S/cm.

3. The solid state battery according to claim 1, wherein the ionic conductor is configured to move from the normal position to the short-circuit position at a temperature equal to or greater than 100° C.

4. The solid state battery according to claim 1, wherein the ionic conductor is a polymer ionic conductor.

5. The solid state battery according to claim 1, wherein the ionic conductor is an inorganic ionic conductor.

6. The solid state battery according to claim 1, wherein the ionic conductor is mounted on a bimetallic actuator.

7. The solid state battery according to claim 6, wherein the stack of cells is surrounded by a metallic casing and a metal forming the bimetallic actuator is the same metal as the metallic casing.

8. The solid state battery according to claim 1, comprising n cells and a number of ionic conductors equal to or greater than n/10.

9. The solid state battery according to claim 1, wherein the ionic conductor is a solid state ionic conductor.

* * * * *